Nov. 30, 1965   A. B. STILES   3,220,794
METHOD OF OXIDIZING GASEOUS PRODUCTS OF
COMBUSTION OF HYDROCARBON
Filed Nov. 15, 1960

INVENTOR
ALVIN B. STILES

BY *Albert B. Griggs*
ATTORNEY

United States Patent Office 3,220,794
Patented Nov. 30, 1965

3,220,794
METHOD OF OXIDIZING GASEOUS PRODUCTS OF COMBUSTION OF HYDROCARBON
Alvin B. Stiles, Charleston, W. Va., assignor to E. I. du Pont de Nemours and Company, Wilmington, Del., a corporation of Delaware
Filed Nov. 15, 1960, Ser. No. 69,384
5 Claims. (Cl. 23—2)

This invention relates to catalysts and processes using catalysts, and is more particularly directed to catalysts which are made up of a mixture of discrete mangano-chromia-manganite particles, some of which are low and some of which are high in the Mn:Cr ratio or a series of mangano-chromia-manganite catalyst beds of some high and some low Mn:Cr ratio. The invention is further directed to processes, particularly for the treatment of combustion products of hydrocarbons containing such materials as nitrogen oxides, carbon monoxide, and hydrocarbons, and is more particularly directed to the treatment of the exhaust of internal combustion engines in which first a mangano-chromia-manganite of high Mn:Cr ratio is used and thereafter the mangano-chromia-manganite of low ratio is used.

Figure 1:
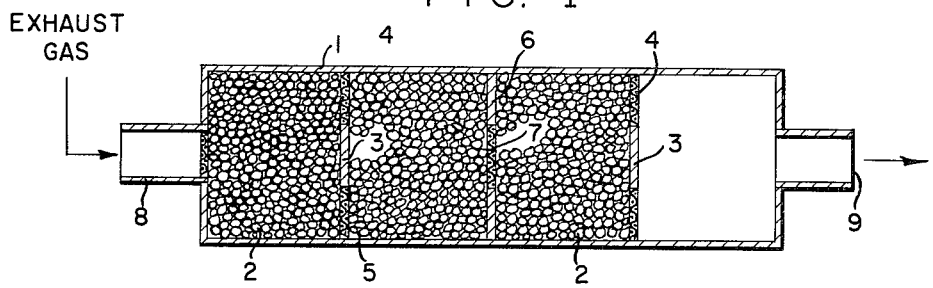
Figure 2:
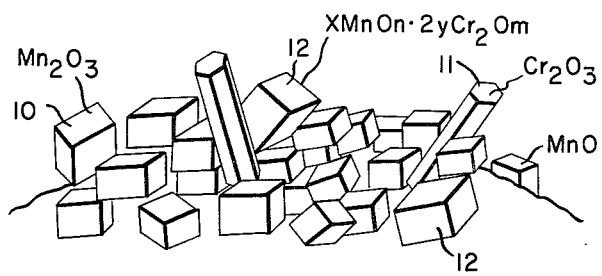
Figure 3:
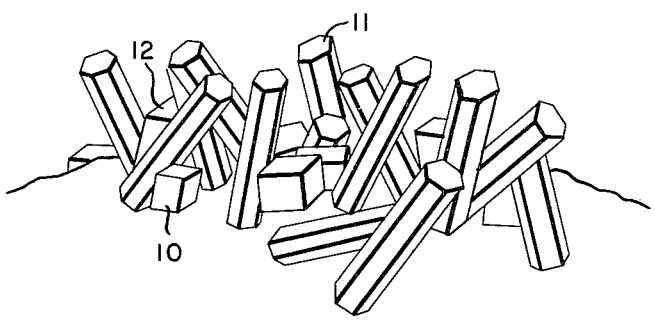

In the drawings:
FIGURE 1 shows a catalytic muffler which can be used for conducting typical processes of the invention,
FIGURE 2 is an artist's conception of a detailed view of the surface of a single catalyst particle which is high in manganese, and
FIGURE 3 is a similar representation of the surface of a catalyst high in chromium.

According to the present invention, combustion gases or other gases to be treated with a catalyst are subjected to the action of discrete mangano-chromia-manganite particles, some of which are high in manganese and some of which are high in chromium. As will be noted hereinafter, the particles can be used as mixtures or sequentially.

It is to be observed that the mixtures of discrete particles lead to quite different results than can be obtained by using manganese chromite which might chemically have the same gross content of manganese and chromium but in uniform proportions throughout. Such manganese chromites are shown, for example, in Lazier U.S. Patent 1,964,001.

The mangano-chromia-manganites of various ratios are described and claimed as such and with co-catalysts, interspersants, and supports in a copending application of Stiles, Serial No. 59,392, filed September 29, 1960, now abandoned.

The mangano-chromia-manganites can be designated as follows:

$$XCr_2O_n \cdot 2YMnO_m$$

in which $n$ can be 2, 3, and 6 and $m$ can be 1, 1.33, 1.5, 2, and 2.5.

In the above formula, the mangano-chromia-manganites of high manganese have a Mn:Cr ratio from 3:0.5 to 3:1.5. The mangano-chromia-manganites of high chromium have a Mn:Cr ratio of 3:3.5 to 3:30. It is noted that instead of the weight ratios just given, the atomic ratio, that of Y:X is substantially the same.

The mangano-chromia-manganites can be prepared by procedures which are described in detail in the Howk and Stiles application above mentioned. Generally, it can be said that they are prepared by reacting appropriate salts of manganese and chromium in aqueous solution. Thus manganese nitrate and chromic acid anhydride are dissolved in water and ammonia is added to make a precipitate. The products of high manganese ratio can be prepared by adjusting the amounts of components, but a high chromium product can be made when a hexavalent chromium salt is used as a chromium source, only by adding further chromium compound, such as ammonium chromate, to the precipitate thus prepared after filtration. Alternatively the appropriate proportion of suitable salts such as manganese nitrate with chromium nitrate can be precipitated or fused together to give mangano-chromia-manganites of the desired Mn:Cr ratio.

A co-catalyst can be included with the mangano-chromia-manganite and there can be used, for example, such co-catalysts as those described in Patent No. 1,964,001. Thus one of the following can be added as the carbonate or can be added as a basic chromate or oxide:

Copper          Cadmium
Nickel          Cobalt
Zinc            Tin
Iron            Bismuth.

The co-catalysts can, of course, be added as other compounds depending upon the specific treatment and processing conditions used.

The amount of the co-catalyst can vary greatly and can range from, say, 1 to 50% by weight based upon the weight of the mangano-chromia-manganite. About 10% is preferred.

It is often desirable to add an interspersant to the catalyst aggregate as described in the above mentioned Stiles application, Serial No. 59,392. The interspersants are refractories which have a melting point above 1000° C. and more preferably above 1600° C. The crystallite size of the refractory should be such that its crystallites keep the crystallites of the mangano-chromia-manganite apart. The refractory crystallites serve a similar function with crystallites of co-catalysts which are present.

The interspersants which can be used include such water-insoluble precipitates as:

(1) Aluminum oxide and hydroxide
(2) Titania
(3) Thoria
(4) Ceria
(5) Chromia
(6) Magnesia
(7) Calcium oxide and hydroxide
(8) Barium oxide and hydroxide
(9) Strontium oxide
(10) Zinc oxide
(11) Manganese oxide
(12) Silica
(13) Beryllia
(14) Zirconia
(15) Lanthana
(16) Hafnia.

Aluminum hydroxide which is present as oxide in the final product is preferred. Manganese oxide and chromia are listed as interspersants to be added in amounts exceeding those which would be present in the mangano-chromia-manganite of the ratios described.

It is to be noted that the interspersants can be added in the first precipitation or formation of the catalyst aggregate and a second interspersant can be added after the catalyst aggregate has been formed and especially after it has been heat-treated or calcined. The interspersants can be heat-decomposable products or they can be introduced in the form of sols or dispersions.

The amount of the interspersants can be widely varied and the total of the first interspersants can run from, say, 5 to 75% based upon the weight of mangano-chromia-manganite plus a co-catalyst if there is one. A second interspersant can range in amount from 0.5 up to 50% or even more by weight of the weight of the catalyst aggregate to which it is added.

Further details of the introduction of interspersants can be found in the Stiles application previously mentioned.

A mangano-chromia-manganite prepared as described can be pilled or tableted in conventional manner, or it can be used as granules. Instead, the catalyst can be supported on a refractory body such as one of the following:

(1) Porous ceramic spheres, tablets, or rings which have a softening or melting point in excess of 1200° C.
(2) Etched nickel, Nichrome, and Inconel wire
(3) Alundum
(4) Pumice
(5) Diaspore
(6) Bauxite
(7) Periclase
(8) Zirconia
(9) Titania
(10) Diatomaceous earth
(11) Calcium sulfate
(12) Barium oxide
(13) Calcium oxide
(14) Activated alumina granules.

The amount of catalyst applied to a support can be varied widely, but ordinarily will run from about 1 to 20% by weight based upon the weight of refractory. The preferred carriers are those of relatively high surface area such as bauxite, zirconia, titania, and alumina.

A catalyst aggregate prepared as above can be calcined, if desired, at a temperature which does not go so high as to result in sintering of catalyst components. Temperatures from about 250 to 800° C. will be satisfactory, and the times can run from a few minutes up to 30 minutes or an hour.

In the drawing there is illustrated a process of the invention in which, as in Example 1, a catalyst high in manganese designated 2 is contained within the reactor 1. Exhaust gases are first contacted by the catalyst high in manganese, and this is selectively active for carbon monoxide. The catalyst is held in place by a ring 3, solid at the center and having web supports holding it from the casing 1. There is a screen 4 provided to retain the catalyst in place.

A second catalyst 5 is provided and this is low in manganese but high in chromium. This is shown at 5. This catalyst is highly active for hydrocarbons. An annular ring 6 is provided to retain the catalyst in its compartment and there is a foraminous member 7 in the opening in the ring 6.

A further quantity of catalyst high in manganese is provided in the third chamber and generally designated by the numeral 2. This catalyst is selectively effective for the oxidation of oxygenated hydrocarbons which would include those having strong odors which result, for example, from reaction in the center section.

The exhaust gases entering at 8 are those from an internal combustion engine and air can be added in the desired amount. This can be supplied by a pump. Treated gases exhaust from the converter at 9.

Instead of using a converter as shown, there can of course be many more sections with alternating high chromium and high manganese catalysts.

In FIGURE 2 there is illustrated the character of the surface of a catalyst particle high in manganese. The surface illustrated is that of a catalyst as prepared in Example 1 and can all be designated as mangano-chromia-manganite as above described. The mangano-chromia-manganite typical crystallites are shown at 12. As earlier described, the mangano-chromia-manganite is a complex ionic crystal containing manganese and chromium in various combination and various states of oxidation. When the manganese is high, as in the catalyst surface illustrated, there will be some excess of manganese oxides illustrated at 11 as $Mn_2O_3$ though there will be similar crystallites of manganese in other states of oxidation and other crystal systems. At 11 there is illustrated chromium oxide which will also be present in some amount depending upon the ratio of manganese to chromium. The manganese oxides, the chromium oxides, and other crystal species are in a sort of equilibrium and, depending upon the temperature and the oxidation or reduction of the catalyst, will shift from one crystal form or system or combination to another.

In FIGURE 3 there is similarly represented the second catalyst shown in Example 1 which is high in chromium. Chromium oxides illustrated can exist in various states of oxidation and $Cr_2O_3$ is illustrative. In this figure the manganese oxides are also illustrated at 10 and the mangano-chromia-manganite crystallite containing both manganese and chromium is illustrated at 12.

According to a preferred practice of the invention a mixture is made of discrete particles of mangano-chromia-manganite having a high manganese ratio with discrete particles having a low ratio as previously discussed. The discrete particles are preferably no smaller than about 200 mesh Tyler screen and may run up to any practical size, even to one inch depending upon the use to which the catalyst is to be put. Ordinarily the size will range from 4 to 16 mesh.

The proportions of the high manganese and the high chromium particles can be varied depending upon the exact composition of gases to be treated. Ordinarily for treating automobile exhaust gases the mixture can be half of each but can be varied widely. Thus, in practice, the proportions can vary from one of the high manganese to ten high chromium, to ten high manganese to one high chromium. Even wider ranges can be used where the magnitude is not important because in any catalyst mixture or in any catalyst sequence using high manganese and high chromium, the benefits obtained are proportional to the extent to which the practices of the invention are followed.

In order that the invention may be better understood, reference should be had to the following illustrative examples.

*Example 1*

(1) One hundred sixty-five parts by weight of manganese as the nitrate and 100 parts by weight of chromic acid anhydride, $CrO_3$, are dissolved in 3,000 parts by weight of water.

(2) Anhydrous ammonia is added to the solution obtained in Step 1 until the precipitation is complete.

(3) The precipitate is filtered and washed, then is dried at 175° C. for 16 hours.

(4) The dried precipitate is calcined at 350° C. for 3 hours.

(5) The calcined material is kneaded with water to densify the powder.

(6) The kneaded paste is dried for 24 hours at 150° C.

(7) The dried densified material is granulated to 100% through an 8 mesh screen mixed with 1% graphite as a pilling lubricant, then is compressed into pills in a conventional pilling machine.

(8) The pills are heat-treated at 500° C. in an oxidizing atmosphere for 3 hours. The catalyst has a manganese:chromium ratio of 3:1. This catalyst can be used as previously described in connection with FIGURE 1 as the catalyst there designated 2 and as shown in FIGURE 2.

(9) A solution is prepared composed of 165 parts by weight of manganese as the nitrate, 200 parts by weight of chromic acid anhydride, $CrO_3$, in 3,000 parts by weight of distilled water.

(10) Anhydrous ammonia is added to the solution obtained in Step 9 until the precipitation is complete.

(11) The precipitate is filtered and washed, then is dried at 175° C. for 16 hours.

(12) The dried precipitate is calcined at 350° C. for 3 hours.

(13) Forty parts by weight of the calcined powder obtained in Step 12 is kneaded with 103 parts by weight of ammonium chromate, $(NH_4)_2CrO_4$, and sufficient water to make a thick paste.

(14) The kneaded paste is dried at 150° C. for 24 hours.

(15) The dried paste is calcined at 350° C. for 3 hours.

(16) The calcined material from Step 15 is granulated to 100% through an 8 mesh screen, mixed with 1% graphite as a pilling lubricant, then is compressed into pills.

(17) The pills are heat treated at 500° C. in an oxidizing atmosphere for 3 hours. The catalyst has a manganese:chromium ratio of 3:9. This catalyst can be used as described in connection with FIGURE 1 as the catalyst 5 which is also illustrated in more detail in FIGURE 3 of the drawing. This catalyst can also be mixed with an equal weight of the catalyst obtained in Step 8 to make a mixed catalyst useful according to the present invention.

The catalysts as described, whether used as mixtures in various ratios or in sequence, can be used as herein described for the treatment of waste products of the combustion of hydrocarbon fuels, such as for the treatment of automobile exhaust gases and treatment of the products of combustion of household heaters and other appliances. They can also be used as suggested earlier for the oxidation of industrial waste gases and for other catalytic oxidations and reductions.

*Example 2*

(1) A solution is made composed of 165 parts by weight of manganese as the nitrate, 15 parts by weight of zirconium oxide as the nitrate, and 50 parts by weight of chromic acid anhydride, $CrO_3$, in 1400 parts by weight of water.

(2) Five hundred parts by weight of activated bauxite granules, 4–8 mesh, are placed in a perforated basket and immersed in the solution described in Step 1.

(3) The granules are placed in a vessel with inlet and exit ports premitting anhydrous ammonia to be admitted at one end and the unused ammonia to be exhausted at the other.

(4) Anhydrous ammonia is fed to the vessel in sufficient quantity to precipitate the metals on the alumina. The point of completion of precipitation is determined by the appearance of ammonia in the exhaust vapors.

(5) The impregnated granules are calcined at 250° C. for 3 hours and are thereafter suitable for use as subsequently described. This catalyst has a manganese to chromium ratio of 3:0.5.

(6) A second catalyst is prepared by first making an aqueous solution composed of 55 parts by weight of manganese as the nitrate, 30 parts by weight of zirconium oxide as the nitrate, and 662 parts by weight of chromic acid anhydride, $CrO_3$, in 3500 parts by weight of distilled water. It will be noted that distilled water or de-ionized water will be required in those localities where the water supply is high in impurities.

(7) Five hundred parts by weight of activated bauxite granules, 4–8 mesh, are placed in a perforated basket and immersed in the solution described in Step 6.

(8) The granules are placed in a vessel with inlet and exit ports permitting anhydrous ammonia to be admitted at one end and the unused ammonia to be exhausted at the other.

(9) Anhydrous ammonia is fed to the vessel in sufficient quantity to precipitate the metals on the alumina. The point of completion of precipitation is determined by the appearance of ammonia in the exhaust vapors.

(10) The impregnated granules are calcined at 250° C. for 3 hours and are thereafter suitable for use as subsequently described. This catalyst has a manganese to chromium ratio of 3:20.

Granules as thus prepared can be mixed with granules as prepared in Step 5 and used as a catalyst for treatment of automobile exhaust gases and other combustion gases as herein described. They can similarly be used for the catalysts designated as 2 and 5 of the invention as described in connection with FIGURE 1.

*Example 3*

(1) A solution is prepared comprising 165 parts by weight of manganese as the nitrate, 32 parts by weight of copper as the nitrate, 30 parts by weight of nickel as the nitrate, 30 parts by weight of thorium oxide as the nitrate, and 200 parts by weight of chromic acid anhydride, $CrO_3$, in 2,000 parts by weight of water.

(2) Five hundred parts by weight of aluminum oxide as activated alumina in 3–12 mesh granules are placed in a perforated vessel and immersed in the solution described in Step 1.

(3) The impregnated granules are placed in a vessel such as that described in Step 3 of Example 2, and anhydrous ammonia is passed through the vessel until precipitation of the metals on the alumina is complete.

(4) The impregnated granules are calcined at 250° C. for 3 hours and are thereafter suitable for use as subsequently described. This catalyst has a manganese to chromium ratio of 3:1.

(5) A solution is prepared by dissolving 55 parts by weight of manganese as the nitrate, 32 parts by weight of copper as the nitrate, 30 parts by weight of nickel as the nitrate, 30 parts by weight of thorium oxide as the nitrate, and 500 parts by weight of chromic acid anhydride, $CrO_3$, in 2,000 parts by weight of water.

(6) Five hundred parts by weight of aluminum oxide as activated alumina in 3–12 mesh granules are placed in a perforated vessel and immersed in the solution described in Step 5.

(7) The impregnated granules are placed in a vessel such as that described in Step 3 of Example 2, and anhydrous ammonia is passed through the vessel until precipitation of the metals is complete.

(8) The impregnated granules are calcined at 250° C. for 3 hours and are thereafter suitable for use as subsequently described. This catalyst has a manganese to chromium ratio of 3:12.

The catalysts prepared in Steps 4 and 8 of this example can be mixed in equal proportions by weight or in other proportions as desired and used as herein described for the treatment of waste gases from burning hydrocarbon fuels such as treatment of automobile exhaust gases. They can similarly be used in sequence as described particularly in connection with FIGURE 1 of the drawings

I claim:

1. In a process for the complete oxidation of gaseous products of combustion of hydrocarbons, the steps comprising first adding air to said gaseous products and then contacting said air containing gaseous products with a mangano-chromia-manganite catalyst having an Mn:Cr ratio of 3:0.5 to 3:1.5 and being highly active for the oxidation of carbon monoxide and also with a mangano-chromia-manganite catalyst having an Mn:Cr ratio of 3:3.5 to 3:30 and being highly active for the oxidation of hydrocarbons.

2. In a process for the complete oxidation of gaseous products of combustion of hydrocarbons, the steps comprising first adding air to said gaseous products and then contacting said air containing gaseous products with a mangano-chromia-manganite having an Mn:Cr ratio of 3:0.5 to 3:1.5 and being highly active as a catalyst for the oxidation of carbon monoxide and thereafter contacting the gas stream with a mangano-chromia-manganite catalyst having an Mn:Cr ratio of 3:3.5 to 3:30 and being highly active for the oxidation of hydrocarbons.

3. In a process for the complete oxidation of gaseous products of combustion of hydrocarbons, the steps comprising first adding air to said gaseous products and then contacting said air containing gaseous products with a catalyst which is highly active for the oxidation of carbon monoxide consisting essentially of a mangano-chromia-manganite having an Mn:Cr ratio of 3:0.5 to 3:1.5 supported upon a refractory carrier and thereafter contacting the gas stream with a catalyst which is highly active for the oxidation of hydrocarbons consisting essentially of a mangano-chromia-manganite having an Mn:Cr ratio of 3:3.5 to 3:30 supported upon a refractory carrier.

4. In a process for the complete oxidation of gaseous products of combustion of hydrocarbons, the steps comprising first adding air to said gaseous products and then contacting said air containing gaseous products with a catalyst which is highly active for the oxidation of carbon monoxide consisting essentially of a mangano-chromia-manganite having an Mn:Cr ratio of 3:0.5 to 3:1.5 supported upon a refractory carrier, and thereafter contacting the gas stream with a catalyst which is highly active for the oxidation of hydrocarbons consisting essentially of a mangano-chromia-manganite having an Mn:Cr ratio of 3:3.5 to 3:30 supported upon a refractory carrier and thereafter again contacting the gas stream with a mangano-chromia-manganite of high Mn:Cr ratio as in the first step.

5. In a process for the complete oxidation of products of combustion of hydrocarbons, the steps comprising first adding air to said gaseous products and then contacting said air containing gaseous products with a catalyst containing a mixture comprised of discrete particles of mangano-chromia-manganite having an Mn:Cr ratio of 3:0.5 to 3:1.5 and being highly active for the oxidation of carbon monoxide and discrete particles of mangano-chromia-manganite having an Mn:Cr ratio of 3:3.5 to 3:30 and being highly active for the oxidation of hydrocarbons.

References Cited by the Examiner

UNITED STATES PATENTS

| | | | |
|---|---|---|---|
| 1,995,353 | 3/1935 | Jenness | 252—471 |
| 2,025,140 | 12/1935 | Wenzel | 23—2 |
| 2,071,119 | 2/1937 | Harger | 23—2 |
| 2,108,156 | 2/1938 | Wortz | 260—595 |
| 2,418,888 | 4/1947 | Kearby | 252—473 |
| 2,867,497 | 1/1959 | Houdry | 23—2 |

MAURICE A. BRINDISI, *Primary Examiner.*

JULIUS GREENWALD, *Examiner.*